(No Model.)
N. TESLA.
ELECTRO MAGNETIC MOTOR.
No. 464,666. Patented Dec. 8, 1891.
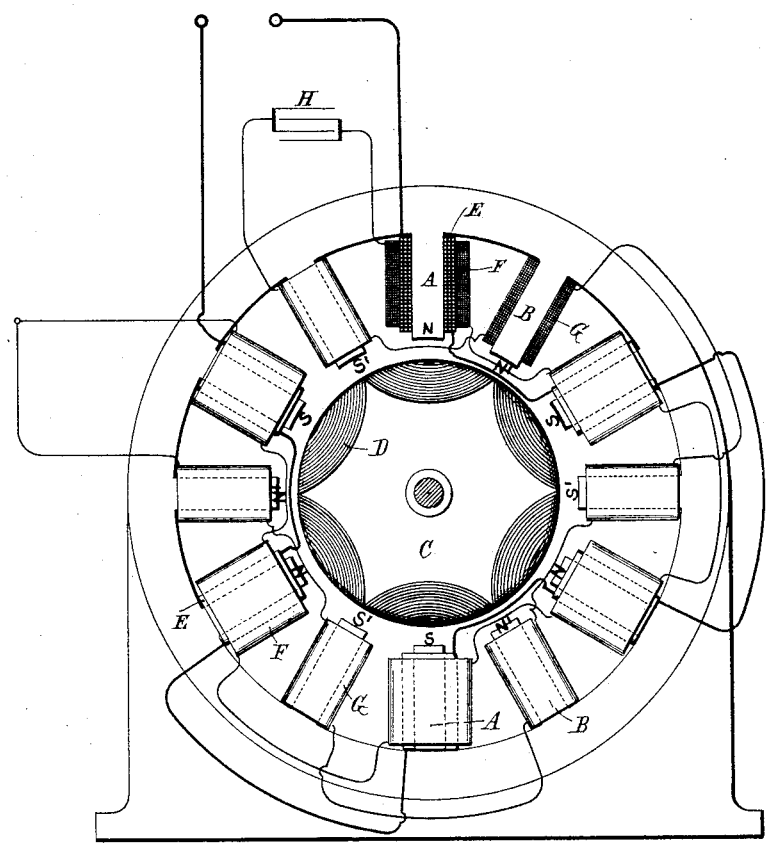
Witnesses:
Raphaël Netter
Frank B. Murphy
Inventor
Nikola Tesla
by
Duncan & Page,
Attorneys

UNITED STATES PATENT OFFICE.

NIKOLA TESLA, OF NEW YORK, N. Y.

ELECTRO-MAGNETIC MOTOR.

SPECIFICATION forming part of Letters Patent No. 464,666, dated December 8, 1891.

Application filed July 13, 1891. Serial No. 399,312. (No model.)

*To all whom it may concern:*

Be it known that I, NIKOLA TESLA, a subject of the Emperor of Austria, from Smiljan, Lika, border country of Austria-Hungary, residing at New York, in the county and State of New York, have invented certain new and useful Improvements in Electro-Magnetic Motors, of which the following is a specification, reference being had to the drawing accompanying and forming a part of the same.

The general object of my present invention is to secure artificially a difference of a quarter of a phase between the currents in the two energizing-circuits of an alternating-current electro-magnetic motor of that general class invented by me, in which the action or operation is dependent upon the inductive influence upon a rotating armature of independent field magnets or coils exerted successively and not simultaniously.

It is a well-known fact that if the field or energizing circuits of such a motor be both derived from the same source of alternating currents and a condenser of proper capacity be included in one of the same, approximately the desired difference of phase may be obtained between the currents flowing directly from the source and those flowing through the condenser; but the great size and expense of condensers for this purpose that would meet the requirements of the ordinary systems of comparatively low potential are practically prohibitory to their employment.

Another now well-known method or plan of securing a difference of phase between the energizing-currents of motors of this kind is to induce by the currents in one circuit those in the other circuit or circuits; but no means have heretofore been proposed that would secure in this way between the phases of the primary or inducing and the secondary or induced currents that difference—theoretically ninety degrees—that is best adapted for practical and economical working.

I have devised a means which renders practicable both the above-described plans or methods, and by which I am enabled to obtain an economical and efficient alternating-current motor, my invention consisting in placing a condenser in the secondary or induced circuit of the motor above described and raising the potential of the secondary currents to such a degree that the capacity of the condenser, which is in part dependent on the potential, need be quite small. The value of this condenser will be determined in a well-understood manner with reference to the self-induction and other conditions of the circuit, so as to cause the currents which pass through it to differ from the primary currents by a quarter-phase.

The drawing is a partly-diagrammatic illustration of a motor embodying my invention.

I have illustrated the invention as embodied in a motor in which the inductive relation of the primary and secondary circuits is secured by winding them inside the motor partly upon the same cores; but it will be understood that the invention applies, generally, to other forms of motor in which one of the energizing-currents is induced in any way from the other.

Let A B represent the poles of an alternating-current motor, of which C is the armature wound with coils D, closed upon themselves, as is now the general practice in motors of this kind. The poles A, which alternate with poles B, are wound with coils of ordinary or coarse wire E in such direction as to make them of alternate north and south polarity, as indicated in the diagram by the characters N S. Over these coils or in other inductive relation to the same are wound long fine-wire coils F F and in the same direction throughout as the coils E. These coils are secondaries, in which currents of very high potential are induced. I prefer to connect all the coils E in one series and all the secondaries F in another.

On the intermediate poles B are wound fine-wire energizing-coils G, which are connected in series with one another and also with the series of secondary coils F, the direction of winding being such that a current-impulse induced from the primary coils E imparts the same magnetism to the poles B as that produced in poles A by the primary impulse. This condition is indicated by the characters N' S'.

In the circuit formed by the two sets of coils F and G is introduced a condenser H; otherwise the said circuit is closed upon itself, while the free ends of the circuit of coils E are connected to a source of alternating currents. As the condenser capacity which is needed in any particular motor of this kind is dependent upon the rate of alternation or the potential, or both, its size or cost, as before explained, may be brought within economical limits for use with the ordinary circuits if the potential of the secondary circuit in the motor be sufficiently high. By giving to the condenser proper values any desired difference of phase between the primary and secondary energizing-circuits may be obtained.

What I claim is—

1. In an alternating-current motor provided with two or more energizing or field circuits, one of which is adapted for connection with a source of currents and the other or others in inductive relation thereto, the combination, with the secondary or induced circuit or circuits, of a condenser interposed in the same, as set forth.

2. In an alternating-current motor, the combination of two energizing-circuits, one connected or adapted for connection with a source of alternating currents, the other constituting a high-potential secondary circuit in inductive relation to the first, and a condenser interposed in said secondary circuit, as set forth.

NIKOLA TESLA.

Witnesses:
 ROBT. F. GAYLORD,
 ERNEST HOPKINSON.